UNITED STATES PATENT OFFICE.

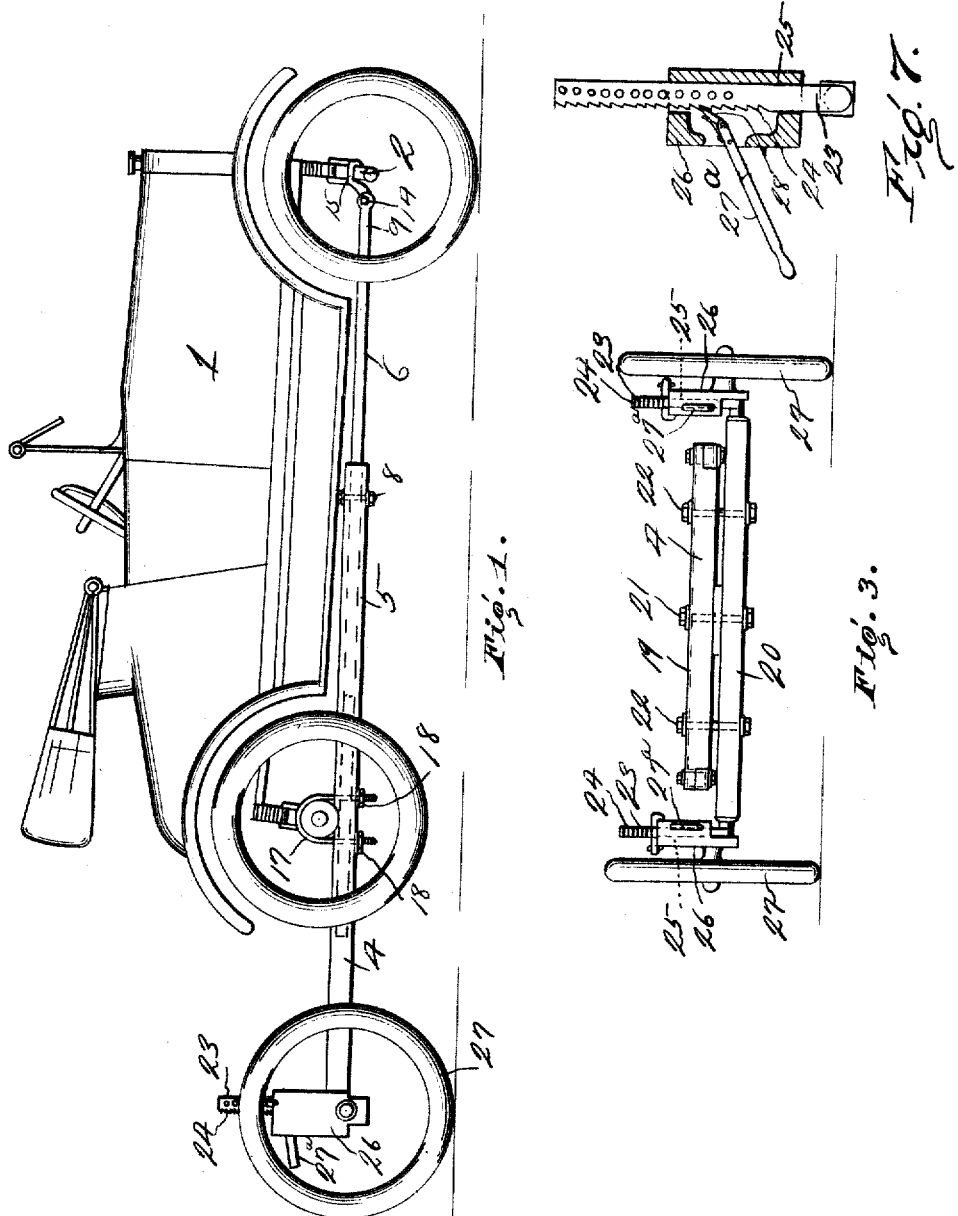

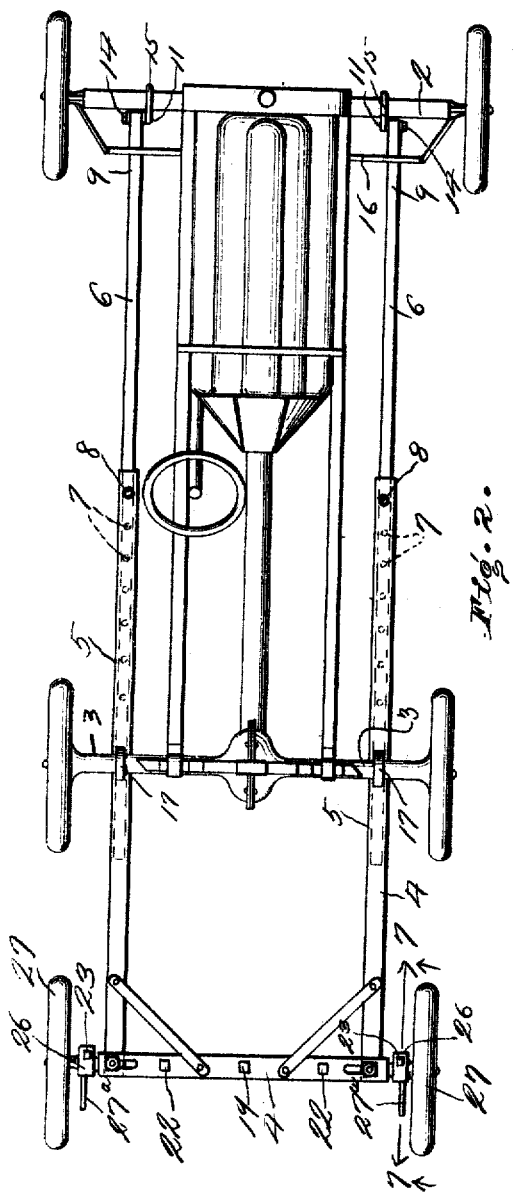

JOSEPH ROY FLEURY, OF JAMESTOWN, KANSAS.

AUTO-TOWING DEVICE.

1,368,619.  Specification of Letters Patent.  Patented Feb. 15, 1921.

Application filed April 14, 1920. Serial No. 373,917.

*To all whom it may concern:*

Be it known that I, JOSEPH ROY FLEURY, a citizen of the United States, residing at Jamestown, in the county of Cloud, State of Kansas, have invented a new and useful Auto-Towing Device; and I do hereby declare the following to be a full, clear, and exact description of the invention, such as will enable others skilled in the art to which it appertains to make and use the same.

The invention relates to automobile towing devices and has for its object to provide a device of this character comprising telescopically engaged beams adapted to be disposed beneath the rear axle of a disabled vehicle and provided with means at their forward ends for engaging the forward axle in such a manner as not to interfere with the steering rod of the front wheels. The rear ends of the supporting beams being connected to an axle on which wheels are mounted, said axle being provided with jacks whereby it may be raised whereby the rear end of the disabled automobile may also be raised.

A further object is to construct the towing device so that it may be used for raising and supporting the forward wheels of the disabled automobile from the ground.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of an automobile showing the device applied thereto.

Fig. 2 is a top plan view of an automobile showing the device applied thereto.

Fig. 3 is a rear elevation of the device.

Fig. 4 is an enlarged plan view of the front axle engaging members of the device.

Fig. 5 is a detail view of the inner face of one of the axle engaging members.

Fig. 6 is a detail view of the inner face of the toothed member carried by one of the supporting bars.

Fig. 7 is a sectional view through one of the jacks for elevating the frame of the device.

Referring to the drawings, the numeral 1 designates a conventional form of automobile and 2 and 3 the front and rear axles thereof. The towing device comprises a U-shaped frame 4, the arms 5 of which are hollow and are preferably formed from tubing. Telescopically engaging in the arms 5 are bars 6, which bars are provided with apertures 7 through any one of which pins 8 may pass which also pass through the ends of the arms 5. The forward ends 9 of the bars 6 have secured thereto toothed plates 10, with which toothed plates toothed plates 11 engage. The plates 11 are provided with threaded studs 12 which pass through apertures 13 in the ends 9 and receive nuts 14 whereby the plates 11 may be adjusted and held in various positions so that the hooked members 15 which engage the front axle 2 of the automobile may be adjusted to clear the connecting rod 16 of the steering mechanism which rod is differently positioned in different makes of automobiles. The arms 5 are provided with yokes 17 which pass over the casing of the rear axle and have their arms fastened to the tubular arms 5 of the U-shaped frame by means of nuts 18. It will be seen that by adjusting the bolts 8 that the U-shaped frame may be applied to any automobile no matter what the wheel base thereof may be. The transverse portion 19 of the U-shaped frame 4 is disposed on the axle 20 and held thereon by a centrally disposed bolt 21 and the bolts 22. When the towing device is used on the rear of an automobile as shown in Fig. 1, the bolts 22 and 21 are in place as shown in Fig. 3. However, when the front end of the automobile is disabled bolts 22 are removed thereby allowing the vehicle to be towed and guided for the reason that the axle 20 will have a pivotal motion on the bolt 21 which acts as a king bolt. The axle 20 is an underslung one. The ends of the axle are provided with upwardly extending arms 23 which arms are provided with ratchet teeth 24. Arms 23 are vertically slidable in bearings 25, or casing 26, on which casings the supporting wheels 27 are pivotally mounted. Pivotally mounted in the casings 26 are operating levers 27. The operating levers 27 are provided with dogs 28, which dogs coöperate with the ratchet teeth 24 so that the frame 4 may be raised, after the arms 5 thereof have been placed beneath the rear end, or the front end of the automobile. The raising action of the end of the U-shaped frame 4 causes the wheels of the disabled automobile to be raised out of engagement with the ground thereby allowing the weight of the disabled automobile to rest upon the auxiliary wheels 27, which will allow the disabled automobile to be towed to any desired place. When the towing device is applied to the front end of the automobile, the operation is similar to that set forth above, with exception that the bolts 22 are removed so that the automobile may be steered by means of the supporting wheels 27 during the towing operation.

From the above it will be seen that an automobile towing device for disabled automobiles is provided which is simple in construction and one wherein it will not be necessary to remove any of the parts of the disabled automobile, it only being necessary to place the arms of the U-shaped frame under the automobile, attach the arms and operate the jacks so that the disabled end of the automobile will be raised.

The invention having been set forth what is claimed as new and useful is:—

A towing device for disabled automobiles comprising a U-shaped frame, the rear end of said U-shaped frame being supported on wheels, the arms of the U-shaped frame having telescopically engaging extension members, the forward end of said extension members having secured thereto hooked members for engaging the axle of the automobile, means for adjusting said hooked members at various angles and in a vertical plane, U-shaped bolts carried by the frame arms and adapted to arch one of the axles of the automobile, the supporting wheels of the U-shaped frame being rotatably mounted on spindles, vertically disposed guides carried by the pintles, an axle detachably connected to the rear end of the frame and provided with upwardly extending rack bars, said rack bars being disposed in the guides carried by the spindles, and means whereby said rack bars may be forced downwardly so that the rear end of the U-shaped frame may be raised for raising the wheels at one end of the automobile free from the ground.

In testimony whereof I have signed my name to this specification in the presence of two subscribing witnesses.

JOSEPH ROY FLEURY.

Witnesses:
HENRY J. HERBIN,
JENS P. ANDERSON.